United States Patent
Deveruex

(12) 
(10) Patent No.: US 6,883,085 B2
(45) Date of Patent: Apr. 19, 2005

(54) HANDLING OF COPROCESSOR INSTRUCTIONS IN A DATA PROCESSING APPARATUS

(75) Inventor: Ian Victor Deveruex, Cambridge (GB)

(73) Assignee: Arm Limited, Cambridge (GB)

(*) Notice: Subject to any disclaimer, the term of this patent is extended or adjusted under 35 U.S.C. 154(b) by 455 days.

(21) Appl. No.: 10/202,029

(22) Filed: Jul. 25, 2002

(65) Prior Publication Data

US 2003/0023831 A1 Jan. 30, 2003

(30) Foreign Application Priority Data

Jul. 30, 2001 (GB) .............................................. 0118518

(51) Int. Cl.⁷ .............................................. G06F 15/00
(52) U.S. Cl. ....................................................... 712/34
(58) Field of Search ..................................... 712/34, 35

(56) References Cited

U.S. PATENT DOCUMENTS

| | | | |
|---|---|---|---|
| 4,992,938 A | | 2/1991 | Cocke et al. |
| 4,994,961 A | * | 2/1991 | MacGregor et al. ......... 710/110 |
| 5,218,711 A | * | 6/1993 | Yoshida ........................ 712/34 |
| 6,505,290 B1 | * | 1/2003 | Moyer et al. .................. 712/34 |
| 6,829,697 B1 | * | 12/2004 | Davis et al. ................... 712/21 |

* cited by examiner

*Primary Examiner*—William M. Treat
(74) *Attorney, Agent, or Firm*—Nixon & Vanderhye P.C.

(57) ABSTRACT

The present invention provides a data processing apparatus and method for handling of coprocessor instructions. The apparatus comprises a processor core for processing a sequence of data processing instructions, and a plurality of coprocessors for executing coprocessor instructions provided within the sequence of data processing instructions. Each coprocessor instruction has a virtual coprocessor number associated therewith for use in identifying which of the plurality of coprocessors is to execute that coprocessor instruction. For each coprocessor instruction with its associated virtual coprocessor number, there are multiple coprocessors within the plurality that may execute that coprocessor instruction, and a coprocessor determination logic is provided to determine for each virtual coprocessor number, based on a mapping, which coprocessor is assigned that virtual coprocessor number, and hence will execute instructions associated with that virtual coprocessor number. Further, in preferred embodiments, the processor core is able to invoke a change in the mapping so as to alter for any virtual coprocessor number the coprocessor that is assigned that virtual coprocessor number, and hence is responsible for executing coprocessor instructions having that virtual coprocessor number associated therewith. This approach provides a very flexible technique for dynamically allocating virtual coprocessor numbers to coprocessors at any appropriate point during execution of the instructions on the processor core, for example upon a task switch.

14 Claims, 6 Drawing Sheets

ENCODER TABLE

| IN | VIRTUAL NO OUTPUT |
|---|---|
| x x x 1 | 0 1 0 0 |
| x x 1 0 | 0 1 0 1 |
| x 1 0 0 | 0 1 1 0 |
| 1 0 0 0 | 0 1 1 1 |

COPROCESSOR NUMBERS 15, 14 } SYSTEM CONTROL / DEBUG 13, 12 } RESERVED 11, 10 } FPU 9, 8 } RESERVED 7, 6, 5, 4 } VIRTUAL COPROCESSOR NUMBERS (REMAPPABLE)

3, 2, 1, 0 } RESERVED

HANDLING OF COPROCESSOR INSTRUCTIONS IN A DATA PROCESSING APPARATUS

BACKGROUND OF THE INVENTION

1. Field of the Invention

The present invention relates to techniques for handling coprocessor instructions in a data processing apparatus.

2. Description of the Prior Art

A data processing apparatus will typically incorporate a processor core for processing a sequence of data processing instructions. To improve the performance of the data processing apparatus, it is known to provide one or more coprocessors designed specifically to handle particular computations. As an example, it has been found that general purpose processors are not well suited to the performance of floating-point computations, and hence this has led to the development of specialised floating-point units (FPUs) to handle such computations. The FPU may be embodied as a coprocessor which the processor core can use to handle floating-point computations. As another example, a coprocessor may be provided specifically for performing MPEG encoding/acceleration.

In data processing apparatus incorporating a number of coprocessors, the sequence of data processing instructions to be processed by the processor core will typically include a number of coprocessor instructions for handling by the appropriate coprocessor. Accordingly, when the processor core comes across such a coprocessor instruction, it will pass that coprocessor instruction to the appropriate coprocessor for execution. In order to identify the appropriate coprocessor for any particular coprocessor instruction, each coprocessor instruction typically has a coprocessor number associated therewith that uniquely identifies the coprocessor which is to execute that coprocessor instruction.

It will be appreciated that the number of bits set aside for specification of the coprocessor number limits the number of coprocessors that may be specified. For example, if four bits are used to specify the coprocessor number, then it is clear that up to sixteen coprocessors can be uniquely identified. Typically, bit space is at a premium. Accordingly, if the number of coprocessors desired in a particular implementation would exceed that uniquely identifiable by the existing bits allocated to specify coprocessor numbers, it will not typically be possible merely to increase the number of bits used to specify the coprocessor number in order to allow all of the desired coprocessors to be uniquely identified.

As an example, the coprocessor number is often specified as a field within the instruction itself. The instruction needs to be specified by a predetermined number of bits, for example 32 bits, and needs to include a variety of information, for example any conditions for execution of the instruction, an identification of the computation required, identification of source and destination registers, etc. Accordingly, each bit within the instruction has to be used very carefully to ensure that all of the required information can be specified within the available bits. Hence, considering the earlier example where four bits are used to specify the coprocessor number, thereby allowing sixteen coprocessors to be uniquely identified, it is unlikely that it would be possible to subsequently allow 5 bits to be used to specify the coprocessor number if it is desired to provide more than sixteen coprocessors.

Further, in certain implementations, one or more of the possible coprocessor numbers may be reserved for future use, and this serves to further limit the number of coprocessors that may be incorporated within any particular design.

Accordingly, as it becomes desirable to add more and more coprocessors into a data processing apparatus design, the problem of allocating coprocessor numbers to those coprocessors will become more acute.

SUMMARY OF THE INVENTION

Viewed from a first aspect, the present invention provides a data processing apparatus, comprising: a processor core for processing a sequence of data processing instructions; a plurality of coprocessors for executing coprocessor instructions provided within the sequence of data processing instructions, each coprocessor instruction having a virtual coprocessor number associated therewith for use in identifying which of the plurality of coprocessors is to execute that coprocessor instruction; for each coprocessor instruction with its associated virtual coprocessor number there being multiple coprocessors within the plurality that may execute that coprocessor instruction, the data processing apparatus further comprising: coprocessor determination logic arranged to determine for each virtual coprocessor number, based on a mapping, which coprocessor is assigned that virtual coprocessor number, and hence will execute instructions associated with that virtual coprocessor number.

In accordance with the present invention, it was realised that at any particular point in time during processing of the sequence of data processing instructions, not all of the coprocessors need to be available for use. Hence, in accordance with the present invention, a number of virtual coprocessor numbers are provided which can be assigned to particular coprocessors as required. Accordingly, a coprocessor instruction can have a virtual coprocessor number associated therewith, and coprocessor determination logic is arranged to determine for that virtual coprocessor number which coprocessor is assigned that virtual coprocessor number. This determination takes place with reference to a mapping.

By this approach, it is possible to incorporate into the data processing apparatus more coprocessors than there are coprocessor numbers available to specify those coprocessors.

The data processing apparatus may be arranged such that the mapping is established once at initialisation. Alternatively, mechanisms may be provided to allow the mapping to be varied dynamically during operation of the data processing apparatus. In preferred embodiments, the processor core is able to invoke a change in the mapping so as to alter for any virtual coprocessor number the coprocessor that is assigned that virtual coprocessor number, and hence is responsible for executing coprocessor instructions having that virtual coprocessor number associated therewith. Hence, in such embodiments the processor core is able to invoke a change in the mapping at any appropriate point.

It will be appreciated that the processor core may in one embodiment directly invoke the change in the mapping, or alternatively a separate mechanism could be provided to change the mapping.

In practice, coprocessors may fall into two categories. A first category is the generic coprocessor that needs to be available at all times, such as a FPU coprocessor or debug and control coprocessors. Preferably, such coprocessors would be assigned a fixed coprocessor number that uniquely identifies the corresponding generic coprocessor, and for which there is no need to employ the coprocessor determination logic. The second category of coprocessor is the application specific coprocessor, an example of which would be the earlier mentioned MPEG encoding/acceleration coprocessor. When a particular application, application thread, task, etc is executing, there will generally be a number of such application specific coprocessors that will need to be available. The application specific coprocessors that need to be available will clearly vary between such applications, application threads, tasks, etc. In preferred embodiments, it is for this category of coprocessor that the virtual coprocessor numbers are provided. Hence, the mapping will provide a mapping between virtual coprocessor numbers and application specific coprocessors, with the coprocessor determination logic arranged to determine at any particular point in time which application specific coprocessor is assigned a particular virtual coprocessor number.

It will be appreciated that the mapping may be stored at any appropriate location within the data processing apparatus, for reference by the coprocessor determination logic. However, in preferred embodiments, the coprocessor determination logic comprises a storage for maintaining the mapping identifying for each virtual coprocessor number the coprocessor that is responsible for executing coprocessor instructions having that virtual coprocessor number associated therewith, the coprocessor determination logic being responsive to the processor core to amend the mapping. In preferred embodiments, the mapping is actually provided within a number of registers within the coprocessor determination logic.

It will be appreciated that there are a number of different ways in which coprocessor instructions may be issued to the appropriate coprocessors by the processor core. For example, some distribution logic may be provided, either within or external to the core, for referencing the coprocessor number associated with each coprocessor instruction and for then routing the coprocessor instruction to the appropriate coprocessor as dictated by that coprocessor number. To enable that distribution logic to operate correctly for coprocessor instructions having a virtual coprocessor number associated therewith, that logic would be arranged to receive a signal from the coprocessor determination logic identifying for each virtual coprocessor number the coprocessor that is assigned that virtual coprocessor number.

However, in preferred embodiments, the processor core is coupled to the plurality of coprocessors via a bus, and is arranged to output on the bus any coprocessor instructions provided within the sequence of data processing instructions, the coprocessor determination logic being arranged to notify each coprocessor of the virtual coprocessor number being used to identify coprocessor instructions to be executed by that coprocessor, and each coprocessor being arranged to determine whether it is to execute a coprocessor instruction present on the bus by reference to the virtual coprocessor number associated with that coprocessor instruction. Accordingly, in such embodiments, the individual coprocessors are responsible for determining which coprocessor instructions they should execute based on the coprocessor number associated with each coprocessor instruction. The coprocessor determination logic notifies each coprocessor of the virtual coprocessor number being used to identify coprocessor instructions to be executed by that coprocessor, thereby enabling each coprocessor instruction to be handled by the desired coprocessor.

It will be appreciated that the processor core can be arranged to invoke a change in the mapping at any appropriate point during processing of the sequence of data processing instructions. In the following text, the term "task" will be used to refer to any application, application thread, task, routine, etc requiring access to a predetermined set of coprocessors. In preferred embodiments, the processor core is arranged to execute data processing instructions from multiple tasks, the coprocessors required varying between tasks, and the processor core being arranged following a task switch to cause the mapping to be amended so that the virtual coprocessor numbers are assigned to the coprocessors required by the currently executing task.

Accordingly, an example of such multiple tasks would be the individual tasks that are switched between when the processor core is executing data processing instructions under the control of a multi-tasking operating system. However, it will be appreciated that there is no requirement for the use of a multi-tasking operating system in order for there to be multiple "tasks" as that term is defined herein.

It will be appreciated that there are a number of ways in which the mapping may be amended following a task switch. A first approach would be for the processor core to cause the mapping to be amended at the time of the task switch, and prior to processing of any data processing instructions following the task switch. This approach is easy to implement, and will ensure that the right mapping between virtual coprocessor numbers and coprocessors is in place before any coprocessor instruction is processed following the task switch. However, the remapping process will typically take a significant time, and accordingly this approach will invoke that time overhead for every task switch.

An alternative approach is one where, upon a task switch, access to the coprocessors is temporarily disabled, whereby if the processor core tries to process a coprocessor instruction, an exception is detected, causing an exception handler to be invoked, the exception handler being arranged to re-enable access to the coprocessors, and to cause the mapping to be amended. In accordance with this approach, if following a task switch to a particular task, that task does not actually require access to a coprocessor before a subsequent task switch takes place, then there will be no overhead incurred in performing the remapping for that task. To ensure that no coprocessor instructions are processed incorrectly, access to the coprocessors is temporarily disabled following a task switch, such that an undefined instruction exception will occur if the processor core tries to issue a coprocessor instruction to the coprocessors. This will cause an exception handler to be invoked, which in preferred embodiments is a software routine used to handle the exception. In this particular instance, the exception handler will be arranged to re-enable access to the coprocessors, and to cause the mapping to be amended in accordance with the current task being executed.

It will be appreciated that there are a number of ways in which access to the coprocessors can be temporarily disabled. Firstly, a value could be stored within a register of the coprocessor determination logic to indicate that no mappings are valid. Alternatively a value could be written in a register of the processor core to disable coprocessor access. In preferred embodiments, one or more coprocessors are actually provided within the processor core for performing debug and control functions, and in preferred embodiments, these particular coprocessors would not be disabled.

It will be appreciated that there are a variety of ways in which the coprocessor determination logic can be arranged. For example, the coprocessor determination logic could comprise a register for each coprocessor, with the virtual coprocessor number, if any, assigned to each coprocessor being stored in the corresponding register. This would enable output signals to be readily generated from the coprocessor determination logic to each coprocessor to inform that coprocessor of the virtual coprocessor number assigned to it. However, such an approach would be relatively complex from the programmer's model point of view, since routines would need to be put in place to ensure that the same virtual coprocessor number is not assigned to more than one coprocessor at any point in time. Further, it would require the use of a relatively large number of registers.

Accordingly, in preferred embodiments, the storage of the coprocessor determination logic is arranged to store for each virtual coprocessor number a coprocessor identifier identifying the coprocessor assigned that virtual coprocessor number, the coprocessor determination logic further comprising: a decoder for receiving the contents of the storage and arranged to generate, for each coprocessor, a coprocessor number signal identifying the virtual coprocessor number assigned to that coprocessor.

This approach will typically require less storage than the alternative approach discussed above. For example, if the data processing apparatus design provides ten application specific coprocessors, of which only a maximum of four are ever used by any particular task, then the preferred approach involves storing for four coprocessor numbers an indication of a coprocessor assigned that coprocessor number, rather than having to store for ten coprocessors an indication of the virtual coprocessor number. A decoder is then used for generating from the contents of the storage a signal to send to each coprocessor to identify the virtual coprocessor number, if any, assigned to that coprocessor.

In preferred embodiments, the storage is further arranged to store with each coprocessor identifier an enable flag identifying whether that coprocessor is to be enabled, the decoder being arranged to generate, for each coprocessor, an enable signal indicating whether that coprocessor is enabled. The use of the enable signal enables the corresponding coprocessor number signal generated for a coprocessor to be further qualified, such that irrespective of the coprocessor number signal received by a particular coprocessor, that coprocessor will only process coprocessor instructions having that virtual coprocessor number if the enable signal confirms that coprocessor is enabled.

In preferred embodiments, the decoder comprises a plurality of decoding elements, one associated with each coprocessor, each decoding element arranged to receive the contents of the storage, and being arranged to generate an output signal identifying the coprocessor number signal and the enable signal for its corresponding coprocessor. Accordingly, in such preferred embodiments, the coprocessor number signal and the enable signal are independently generated for each coprocessor.

Furthermore, in preferred embodiments, each decoding element comprises comparator logic for comparing the coprocessor identifiers in the storage with the coprocessor identifier of the associated coprocessor, and an encoder for generating from the output of the comparator logic the coprocessor number signal for its corresponding coprocessor. Clearly, if the comparator logic indicates a match between the coprocessor identifiers in the storage and the coprocessor identifier of the associated coprocessor, then the encoder is arranged to generate a signal identifying the relevant virtual coprocessor number to the coprocessor. If the comparator logic indicates no match, then it is clear that the coprocessor number signal could take a variety of forms. For example, it could be assigned a default value which would indicate to the coprocessor that coprocessor is not currently in use.

However, in preferred embodiments, each decoding element further comprises enable signal generation logic for generating, based on the output of the comparator logic and the enable flags from the storage, the enable signal for its corresponding coprocessor. By this approach, it is not relevant what the value of the coprocessor number signal is when the comparator logic does not identify a match, since in any event the enable signal will indicate to the corresponding coprocessor that is not enabled, and accordingly that coprocessor will not process any coprocessor instructions until such time as it does become enabled, at which point it will also receive a coprocessor number signal identifying the relevant virtual coprocessor number assigned to it.

Viewed from a second aspect, the present invention provides a method of operating a data processing apparatus to execute coprocessor instructions, the data processing apparatus having a processor core for processing a sequence of data processing instructions, and a plurality of coprocessors for executing coprocessor instructions provided within the sequence of data processing instructions, the method comprising the steps of: (i) associating with each coprocessor instruction a virtual coprocessor number for use in identifying which of the plurality of coprocessors is to execute that coprocessor instruction, for each coprocessor instruction with its associated virtual coprocessor number there being multiple coprocessors within the plurality that may execute that coprocessor instruction; and (ii) determining for each virtual coprocessor number, based on a mapping, which coprocessor will execute instructions associated with that virtual coprocessor number.

BRIEF DESCRIPTION OF THE DRAWINGS

The present invention will be described, further by way of example only, with reference to a preferred embodiment thereof as illustrated in the accompanying drawings, in which:

FIG. 7 gives an example of the use of coprocessor numbers.

DESCRIPTION OF PREFERRED EMBODIMENTS

Figure 1:
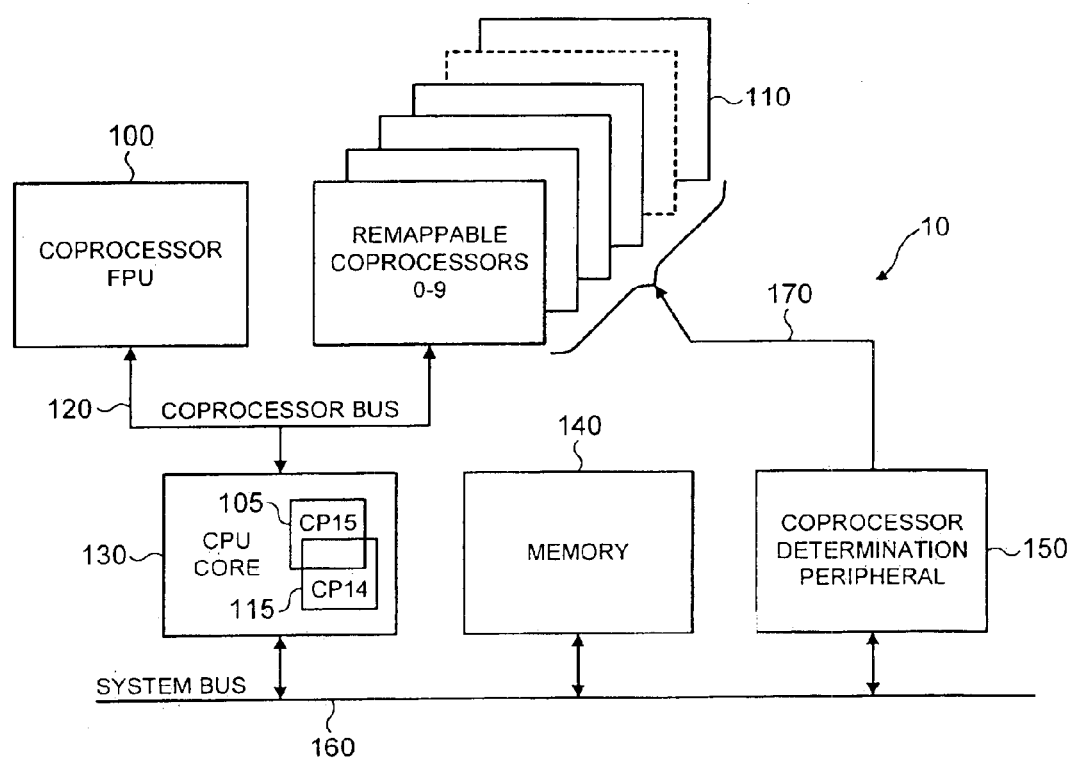
FIG. 1 is a block diagram illustrating elements of a data processing apparatus in accordance with a first embodiment of the present invention.

FIG. 1 illustrates a data processing apparatus 10 comprising a main processor 130, also referred to herein as a CPU core, a floating-point unit (FPU) coprocessor 100, a number (in this example 10) of remappable coprocessors 110, a memory 140 and a coprocessor determination peripheral 150. The main processor 130, the memory 140 and the coprocessor determination peripheral 150 are linked via a main bus 160 (also referred to herein as the system bus). A coprocessor bus 120 links the main processor 130 to the various coprocessors 100, 110. In addition to the coprocessors external to the main processor 130, one or more coprocessors 105, 115 can also be provided within the main processor 130. In the example of FIG. 1, two coprocessors 105 and 115, also referred to herein as CP 14 and CP 15, are provided within the main processor 130 for performing debug and control functions.

In operation, the main processor 130 executes a sequence of data processing instructions that control data processing operations of a general type including interactions with the memory 140, and other components that may be connected to the system bus 160, for example a cache memory or an input/output system (for simplicity, such additional logic elements have been omitted from FIG. 1). Embedded within the sequence of data processing instructions are coprocessor instructions. The main processor 130 recognises these coprocessor instructions as being of a type that should be executed by an attached coprocessor, in preferred embodiments this being done with reference to a coprocessor number field within the coprocessor instruction. Accordingly, the main processor 130 issues these coprocessor instructions on the coprocessor bus 120 from where they are received by any attached coprocessors. The attached coprocessors are aware of which coprocessor number is assigned to them, and accordingly will accept and execute any received coprocessor instructions that include the corresponding coprocessor number.

The size of the coprocessor number field within the coprocessor instruction dictates the number of unique coprocessor numbers that can be specified. Accordingly, as an example, if the coprocessor number field is 4 bits in length, then up to 16 coprocessors can be uniquely identified by corresponding coprocessor numbers. However, in practice, it often the case that some of the coprocessor numbers will be reserved for future functions, and accordingly the number of coprocessor numbers available for unique assignment to coprocessors is likely to be less than 16.

In accordance with preferred embodiments of the present invention, a technique is provided whereby the number of coprocessors that can be provided within the data processing apparatus can exceed the total number of coprocessor numbers available for assignment to those coprocessors, and is intended for use in data processing apparatus where any particular task being executed will only need access to a subset of all of the available coprocessors.

In accordance with preferred embodiments of the present invention, a subset of the total available coprocessor numbers are deemed to be virtual coprocessor numbers which can be allocated as and when required to appropriate coprocessors, rather than having a fixed assignment between coprocessor number and coprocessor. There are clearly many different ways in which the coprocessor numbers may be allocated, and any subset of those coprocessor numbers may be used as virtual coprocessor numbers. However, one particular example of the use of the coprocessor numbers in an implementation having a 4-bit coprocessor number field is illustrated in FIG. 7. As shown in FIG. 7, coprocessor numbers 0 to 3, 8 and 9, and 12 and 13 are reserved for future use. Coprocessor numbers 14 and 15 are always used to refer to the system control/debug coprocessors CP 14 and CP 15, and coprocessor numbers 10 and 11 are always used to reference the FPU coprocessor 100. In preferred embodiments, two coprocessor numbers are assigned to the FPU 100 to identify two distinct modes of operation, namely single precision and double precision modes of operation.

With this allocation of coprocessor numbers, it is clear that only coprocessor numbers 4, 5, 6 and 7 are available for allocation to other coprocessors. If no more than 4 additional coprocessors were required by the data processing apparatus, this would clearly present no problem. However, in the example of FIG. 1, there are 10 additional coprocessors 110, with only 4 available coprocessor numbers to reference those coprocessors. Hence, in accordance with preferred embodiments of the present invention, coprocessor numbers 4 to 7 are deemed to be virtual coprocessor numbers which can be mapped to specific ones of the remappable coprocessors 110 as appropriate for any particular task. This enables up to 4 of the remappable coprocessors 110 to be used by any particular task being executed by the main processor 130.

To ensure that coprocessor instructions output onto the coprocessor bus 120 are executed in the correct manner by the correct coprocessor, a coprocessor determination peripheral 150 is provided which in preferred embodiments is coupled to the main processor 130 via the system bus 160. This coprocessor determination peripheral 150 is responsible for determining for each virtual coprocessor number, based on a mapping, which coprocessor is assigned that virtual coprocessor number, and for disseminating that information to the remappable coprocessors 110. The manner in which this is achieved in preferred embodiments will now be described in more detail with reference to FIGS. 3 and 4.

Figure 3:
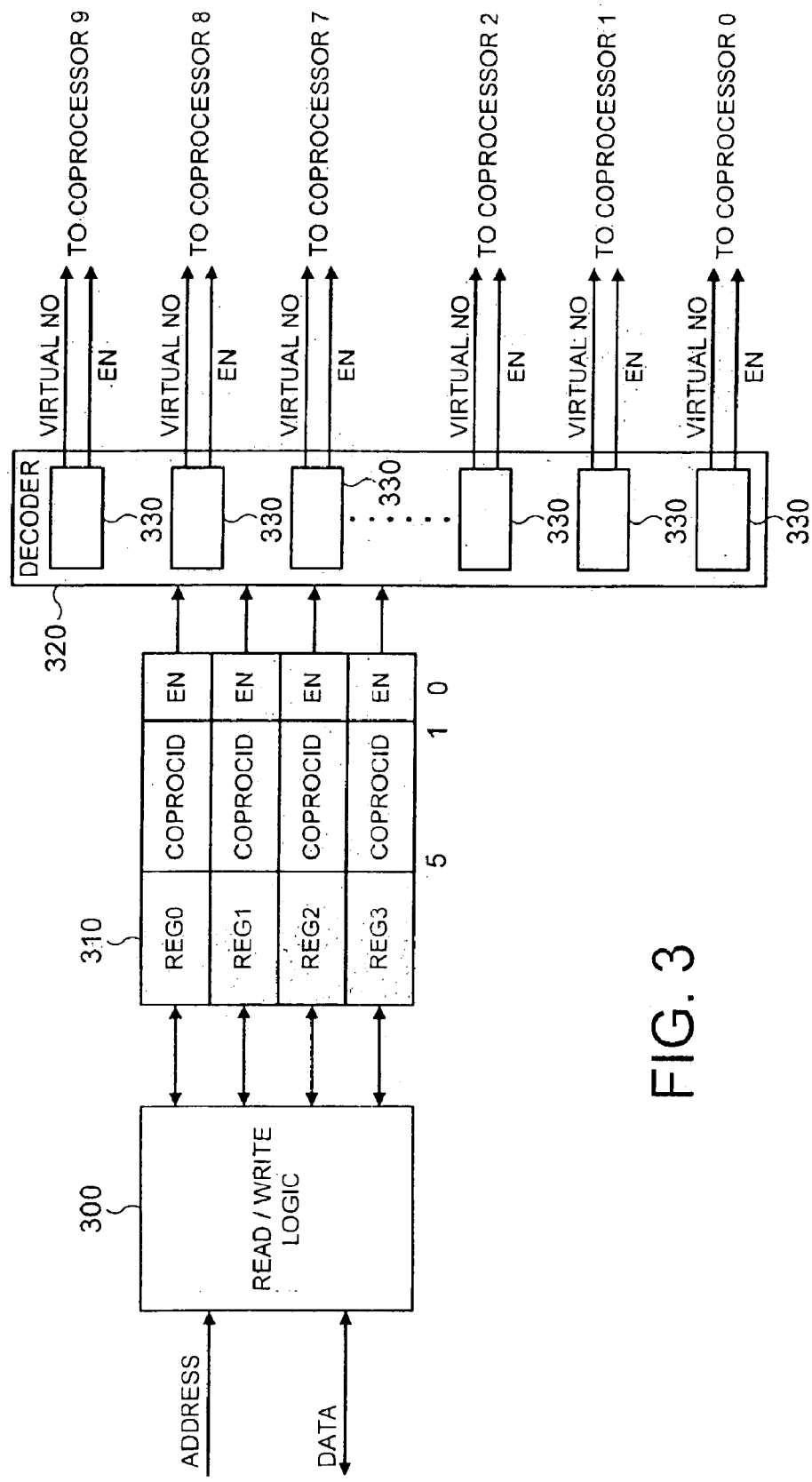
FIG. 3 is a block diagram illustrating an embodiment of the coprocessor determination logic of preferred embodiments of the present invention.

FIG. 3 illustrates the basic components of the coprocessor determination peripheral 150 in preferred embodiments of the present invention. A plurality of registers 310 are provided, one for each virtual coprocessor number. Hence, with reference to the coprocessor number allocation of FIG. 7, four registers are provided, register 0 being associated with virtual coprocessor number 4, register 1 being associated with virtual coprocessor number 5, register 2 being associated with virtual coprocessor number 6 and register 3 being associated with virtual coprocessor number 7.

Periodically, such as upon a task switch, the main processor 130 will output a signal via the system bus 160 to the coprocessor determination peripheral 150 instructing it to update the contents of the registers 310 with data output by the main processor 130 on the system bus 160. These signals will be received by read/write logic 300 within the coprocessor determination peripheral 150. Each of the registers 310 will be identified via an address received by the read/write logic 300, and associated with that address will be data to store within the corresponding register. In particular, in preferred embodiments, a 1-bit enable value and a 4-bit coprocessor identifier value is provided for each register. The coprocessor identifier (also referred to herein as the coprocessor ID) identifies which of the 10 remappable coprocessors 110 is associated with the virtual coprocessor number corresponding to the particular register 310, and the enable value indicates whether that coprocessor is to be enabled.

It will be appreciated that as only 5 bits of information are required to be stored in each register, and as each register is typically 16 bits in length, it would be possible to reduce the number of registers required to 2, by inclusion of some further logic to deal with writing to either the upper or the lower half of the individual registers. However, for simplicity, the preferred embodiment uses a separate register to be associated with each virtual coprocessor number.

The coprocessor determination peripheral 150 is arranged to output a signal to each of the remappable coprocessors 110 over path 170 to indicate the virtual coprocessor number assigned to that coprocessor, and an indication as to whether that coprocessor is enabled. This function is performed by the decoder 320, which receives the data from each of the four registers 310, and is arranged to then generate a set of ten signals to be output to the corresponding coprocessors 110. In preferred embodiments, the decoder incorporates a decoding element 330 for each remappable coprocessor, the construction of the decoding element 330 being illustrated in more detail with reference to FIG. 4.

Figure 4:
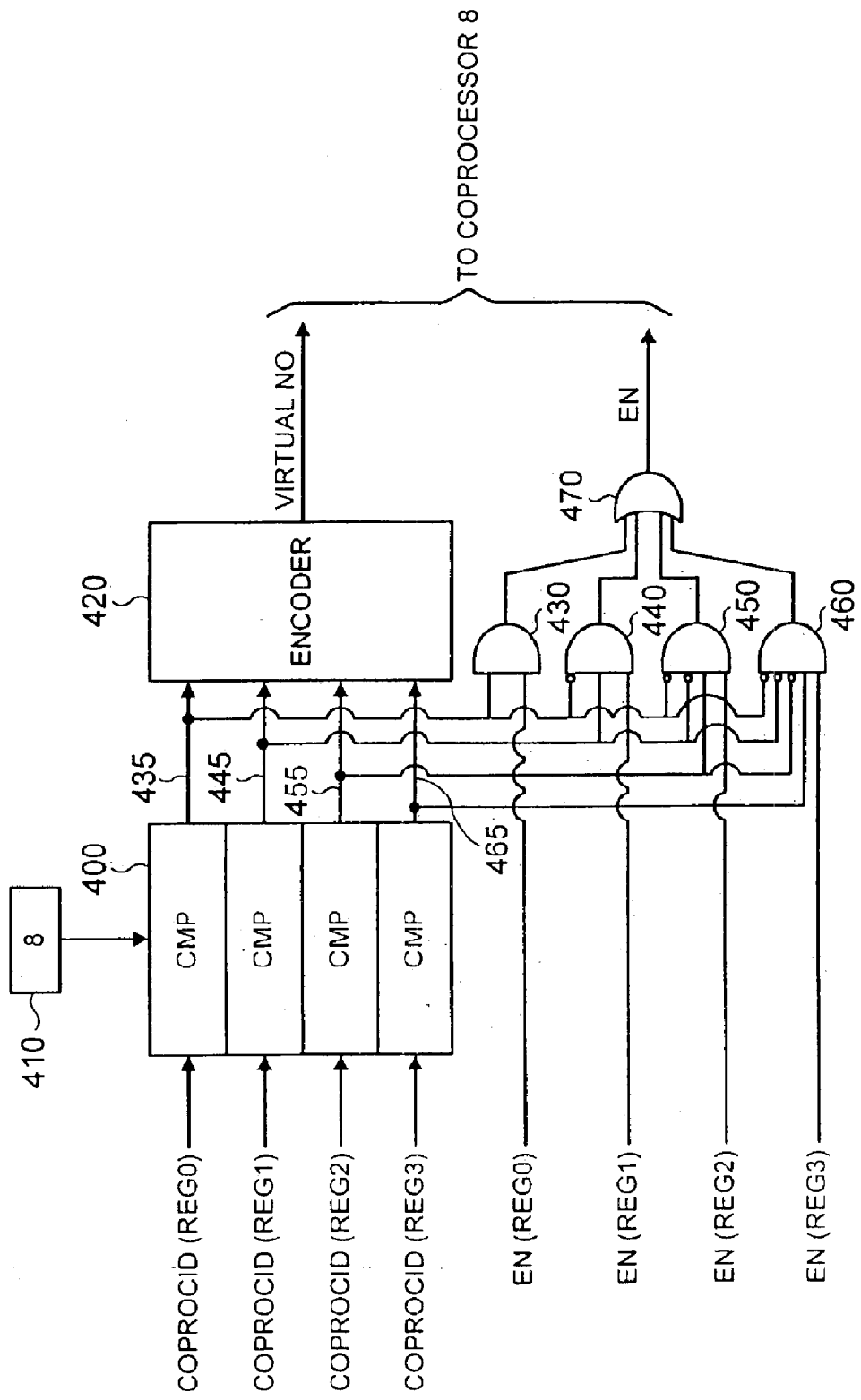
FIG. 4 is a block diagram illustrating in more detail the construction of one of the decoding elements within the decoder in accordance with preferred embodiments.

As shown in FIG. 4, each decoding element 330 receives the coprocessor ID and enable values from each of the four registers 310. The coprocessor ID values are provided to a bank of comparators 400, each comparator comparing the coprocessor ID received as its input with the coprocessor ID stored in register 410, that coprocessor ID identifying the remappable coprocessor with which that decoding element is associated. In FIG. 4, the decoding element 330 is assumed to be the one associated with coprocessor 8, and accordingly the coprocessor ID stored in register 410 will identify coprocessor 8.

Figures 5, 6:
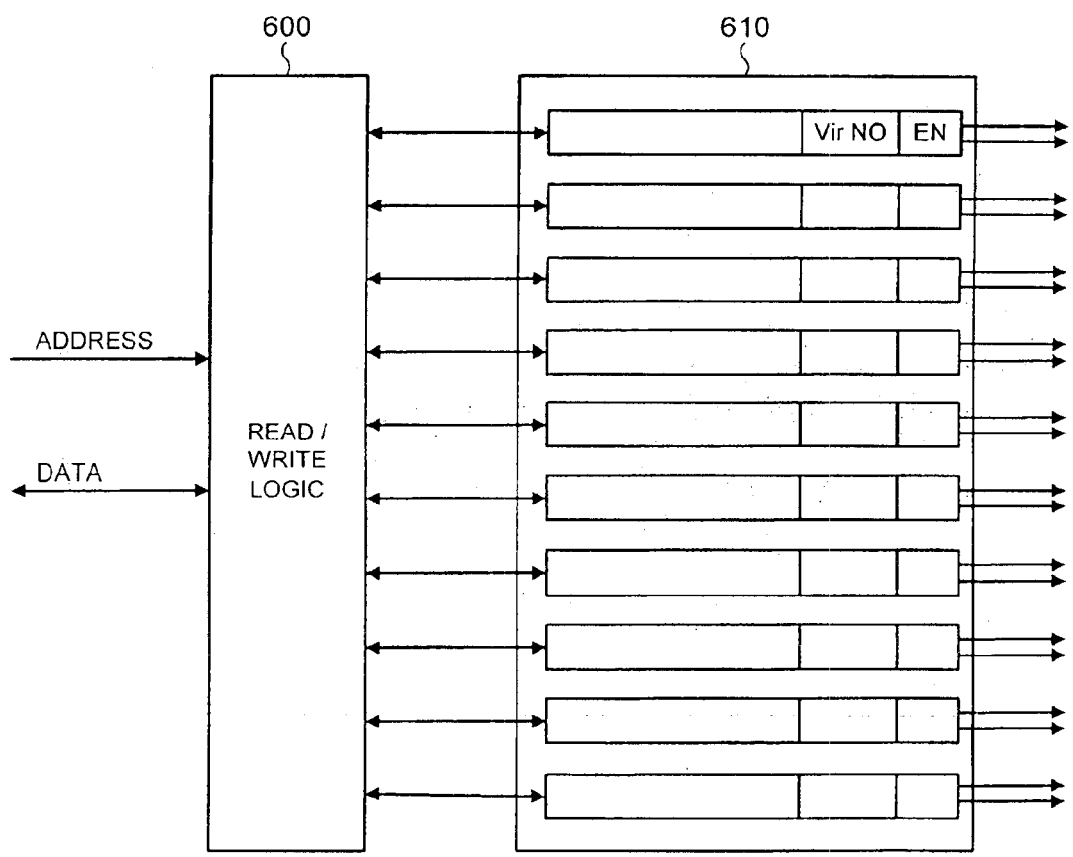
FIG. 5 is a table illustrating operation of the encoder illustrated in FIG. 4.
FIG. 6 illustrates an alternative embodiment of the coprocessor determination logic.

Each comparator 400 will generate a hit signal (preferably a logic 1 value) if the coprocessor ID input to that comparator matches the coprocessor ID in register 410, and will otherwise output a logic 0 value. All four outputs from the comparators 400 are passed as inputs to an encoder 410 which is arranged to generate a virtual coprocessor number to be output to the relevant coprocessor based on those four inputs. The encoding used in preferred embodiments is illustrated by the table of FIG. 5.

Accordingly, as illustrated in that table, if a hit signal is output by the comparator 400 receiving the coprocessor ID from register 0, then the virtual coprocessor number output will be 4 irrespective of the signals generated by the other three comparators. If the comparator receiving the coprocessor ID from register 0 does not generate a hit signal, but the comparator arranged to receive the coprocessor ID from register 1 does generate a hit signal, then the virtual coprocessor number output will be 5, irrespective of the outputs from the other two comparators. Similarly, if a hit signal is generated by the comparator receiving the coprocessor ID from register 2, with no hit signal being generated by the comparators looking at the contents of register 0 and register 1, then the virtual coprocessor number output will be 6 irrespective of the output from the comparator looking at the content of register 3. Finally, if a hit signal is generated by the comparator receiving the coprocessor ID from register 3, then a virtual coprocessor number of 7 will be output by the encoder 420, assuming none of the other comparators produce a hit signal.

By this approach, it can be seen that the coprocessors required by any particular task (up to a maximum of four) will receive from the decoder 320 an indication of the virtual coprocessor number being associated with coprocessor instructions that those coprocessors should execute. For the coprocessors not being used by any particular task, the encoder 420 of the corresponding decoding element 330 will receive four logic 0 values from the comparators 400. In such situations, the encoder 420 could be arranged to generate a unique output which would indicate to the coprocessors that they have not been selected. However, in preferred embodiments, the actual value of the virtual coprocessor number output by the encoder 420 in such situations is not important, since additional logic is provided within each decoding element 330 to generate an enable signal, which will have a logic 0 value for any coprocessor that is not required by the particular task being executed by the main processor 130.

This logic consists of four AND gates 430, 440, 450 and 460, the outputs of which are routed to an OR gate 470 used to generate the enable signal output to the corresponding coprocessor. AND gate 430 receives the enable signal stored in register 0, along with the output signal on path 435 from the comparator receiving the coprocessor ID from register 0. Accordingly, if a match is found between the coprocessor ID in register 0 and the coprocessor ID of the corresponding coprocessor, and the enable signal is set, AND gate 430 will output a logic 1 value, which in turn will be output via OR gate 470 as a set enable signal to indicate to the relevant coprocessor that it is enabled. In this instance, none of the AND gates 440, 450 and 460 can generate a logic 1 output, since they receive as one of their inputs an inverted version of the signal output on path 435 (i.e. a logic 0 value).

Similarly, if any particular decoding element generates a match signal on path 445, but not on path 435, then the virtual coprocessor number output will be 5, and the relevant enable signal to be monitored is that produced by AND gate 440. AND gate 440 will produce a logic 1 output assuming the enable signal in register 1 is set, since the signal on path 435 will be 0 and the signal on path 445 will be 1. It will be appreciated that none of the other AND gates 430, 450 or 460 can produce a logic 1 output, and accordingly the enable signal output from OR gate 470 is dictated by the output of AND gate 440.

In a similar fashion, it can been that if a hit signal is generated on path 455, then the enable signal is dictated by the output of AND gate 450, whilst if a hit signal is generated on path 465, the enable signal generated by OR gate 470 is dictated by the output of AND gate 460.

Accordingly, it can be seen that the coprocessor determination peripheral 150 serves to determine the virtual coprocessor numbers allocated to each remappable coprocessor 110, along with a determination as to which of those coprocessors is enabled, and then disseminates that information to the corresponding coprocessors, so that they are in a position to execute coprocessor instructions output on the coprocessor bus 120 and destined for them.

FIG. 6 is a block diagram illustrating an alternative embodiment of the coprocessor determination peripheral 150, that can be used instead of the logic shown in FIGS. 3 and 4. In accordance with this embodiment, read/write logic 600 analogous to the read/write logic 300 of FIG. 3 is provided. However, the register bank 610 contains a register for each remappable coprocessor 110, and so in the example embodiment will contain ten registers. Thus, the read/write logic needs to be able to read and write to each of the ten registers within the register bank 610. At any suitable point, for example following a task switch, the main processor 130 will issue a signal to the coprocessor determination peripheral 150 instructing it to update the contents of the registers 610 with the new data output over the system bus 160. For each register, data will be provided specifying the virtual coprocessor number allocated to the corresponding coprocessor, along with an enable signal indicating whether that coprocessor is enabled. This data can then be output directly to the relevant coprocessor over path 170 without the need for a decoder 320.

Even though the embodiment illustrated in FIG. 6 does not require any decoder, it still potentially will require a larger piece of logic, given the larger number of registers required. In addition, such an embodiment will typically be more complex from the programmer's model point of view, given the requirement to ensure that conflicting information is not stored in any of the registers.

Figure 2:
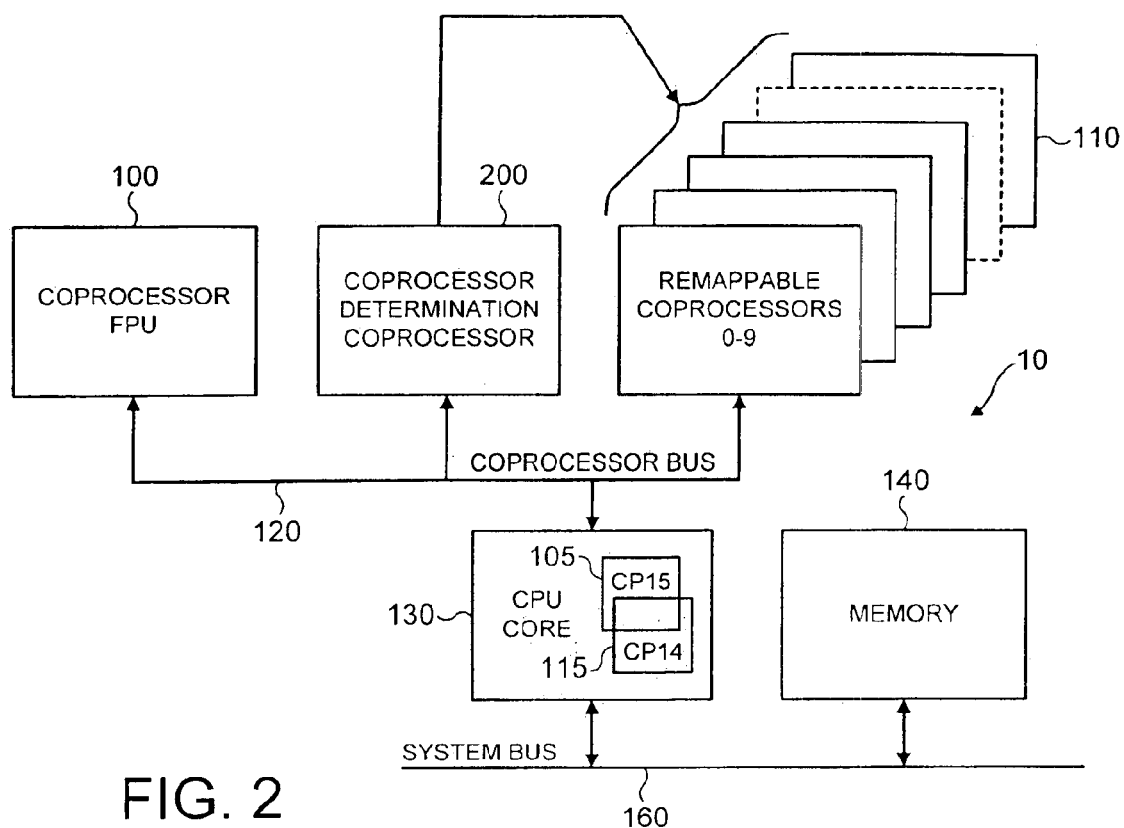
FIG. 2 is a block diagram illustrating elements of a data processing apparatus in accordance with a second embodiment of the present invention.

In the FIG. 1 embodiment, the coprocessor determination peripheral 150 is illustrated as being coupled to the main processor 130 via the system bus 160. However, it will be appreciated that there is no requirement for the coprocessor determination peripheral 150 to be coupled in this way, and instead it would be possible for the coprocessor determination logic to be implemented as a separate coprocessor coupled to the main processor 130 via the coprocessor bus 120. Such an arrangement is illustrated in FIG. 2. Fundamentally, the operation of the coprocessor determination coprocessor 200 will be the same as the operation of the coprocessor determination peripheral 150 of FIG. 1. However, the main processor 130 will contact the coprocessor determination coprocessor 200 via the use of one or more coprocessor instructions, with the coprocessor number field of such coprocessor instructions specifying that particular coprocessor 200. Clearly, in such embodiments, the coprocessor determination coprocessor 200 would preferably have a fixed coprocessor number in a similar manner to the fixed number assigned to the FPU coprocessor 100.

From the above description, it will be appreciated that preferred embodiments of the present invention provide a technique whereby coprocessor numbers can be allocated to particular coprocessors dynamically, with a simple peripheral being provided to determine for a particular coprocessor number the actual coprocessor assigned to that number at that time. This simple peripheral unit can be programmed under the control of the processor core such that the mapping between virtual coprocessor numbers and coprocessors can be altered at desired points, such as upon a task switch. For any particular task, the code executed by the processor core will identify which coprocessors are meant to handle coprocessor instructions having particular coprocessor numbers, and this information is used to generate the required update information to be passed to the peripheral to update its mapping.

Although a particular embodiment of the invention has been described herewith, it will be apparent that the invention is not limited thereto, and that many modifications and additions may be made within the scope of the invention. For example, various combinations of the features of the following dependent claims could be made with the features of the independent claims without departing from the scope of the present invention.

I claim:

1. A data processing apparatus, comprising:
   a processor core for processing a sequence of data processing instructions;
   a plurality of coprocessors for executing coprocessor instructions provided within the sequence of data processing instructions, each coprocessor instruction having a virtual coprocessor number associated therewith for use in identifying which of the plurality of coprocessors is to execute that coprocessor instruction;
   for each coprocessor instruction with its associated virtual coprocessor number there being multiple coprocessors within the plurality that may execute that coprocessor instruction, the data processing apparatus further comprising:
   coprocessor determination logic arranged to determine for each virtual coprocessor number, based on a mapping, which coprocessor is assigned that virtual coprocessor number, and hence will execute instructions associated with that virtual coprocessor number.

2. A data processing apparatus as claimed in claim 1, wherein the processor core is able to invoke a change in the mapping so as to alter for any virtual coprocessor number the coprocessor that is assigned that virtual coprocessor number, and hence is responsible for executing coprocessor instructions having that virtual coprocessor number associated therewith.

3. A data processing apparatus as claimed in claim 2, wherein the coprocessor determination logic comprises a storage for maintaining the mapping identifying for each virtual coprocessor number the coprocessor that is responsible for executing coprocessor instructions having that virtual coprocessor number associated therewith, the coprocessor determination logic being responsive to the processor core to amend the mapping.

4. A data processing apparatus as claimed in claim 1, wherein the processor core is coupled to the plurality of coprocessors via a bus, and is arranged to output on the bus any coprocessor instructions provided within the sequence of data processing instructions, the coprocessor determination logic being arranged to notify each coprocessor of the virtual coprocessor number being used to identify coprocessor instructions to be executed by that coprocessor, and each coprocessor being arranged to determine whether it is to execute a coprocessor instruction present on the bus by reference to the virtual coprocessor number associated with that coprocessor instruction.

5. A data processing apparatus as claimed in claim 1, wherein the processor core is arranged to execute data processing instructions from multiple tasks, and wherein the coprocessors required varies between tasks, the processor core being arranged following a task switch to cause the mapping to be amended so that the virtual coprocessor numbers are assigned to the coprocessors required by the currently executing task.

6. A data processing apparatus as claimed in claim 5, wherein the processor core is arranged to cause the mapping to be amended at the time of the task switch, and prior to processing of any data processing instructions following the task switch.

7. A data processing apparatus as claimed in claim 5, wherein upon a task switch, access to the coprocessors is temporarily disabled, whereby if the processor core tries to process a coprocessor instruction, an exception is detected, causing an exception handler to be invoked, the exception handler being arranged to re-enable access to the coprocessors, and to cause the mapping to be amended.

8. A data processing apparatus as claimed in claim 1, wherein the coprocessor determination logic comprises a storage for maintaining the mapping identifying for each virtual coprocessor number the coprocessor that is responsible for executing coprocessor instructions having that virtual coprocessor number associated therewith, the coprocessor determination logic being responsive to the processor core to amend the mapping, and wherein the storage of the coprocessor determination logic is arranged to store for each virtual coprocessor number a coprocessor identifier identifying the coprocessor assigned that virtual coprocessor number, the coprocessor determination logic further comprising:
   a decoder for receiving the contents of the storage and arranged to generate, for each coprocessor, a coprocessor number signal identifying the virtual coprocessor number assigned to that coprocessor.

9. A data processing apparatus as claimed in claim 8, wherein the storage is further arranged to store with each coprocessor identifier an enable flag identifying whether that coprocessor is to be enabled, the decoder being arranged to generate, for each coprocessor, an enable signal indicating whether that coprocessor is enabled.

10. A data processing apparatus as claimed in claim 9, wherein the decoder comprises a plurality of decoding elements, one associated with each coprocessor, each decoding element arranged to receive the contents of the storage, and being arranged to generate an output signal identifying the coprocessor number signal and the enable signal for its corresponding coprocessor.

11. A data processing apparatus as claimed in claim 10, wherein each decoding element comprises comparator logic for comparing the coprocessor identifiers in the storage with the coprocessor identifier of the associated coprocessor, and an encoder for generating from the output of the comparator logic the coprocessor number signal for its corresponding coprocessor.

12. A data processing apparatus as claimed in claim 11, wherein each decoding element further comprises enable signal generation logic for generating, based on the output of the comparator logic and the enable flags from the storage, the enable signal for its corresponding coprocessor.

13. A method of operating a data processing apparatus to execute coprocessor instructions, the data processing apparatus having a processor core for processing a sequence of data processing instructions, and a plurality of coprocessors for executing coprocessor instructions provided within the sequence of data processing instructions, the method comprising the steps of:

(i) associating with each coprocessor instruction a virtual coprocessor number for use in identifying which of the plurality of coprocessors is to execute that coprocessor instruction, for each coprocessor instruction with its associated virtual coprocessor number there being multiple coprocessors within the plurality that may execute that coprocessor instruction; and (ii) determining for each virtual coprocessor number, based on a mapping, which coprocessor will execute instructions associated with that virtual coprocessor number.

14. A method as claimed in claim 13, further comprising the step of:

(iii) enabling a change in the mapping so as to alter for any virtual coprocessor number the coprocessor that is responsible for executing coprocessor instructions having that virtual coprocessor number associated therewith.

* * * * *